United States Patent [19]

Dörr et al.

[11] 3,950,493

[45] Apr. 13, 1976

[54] PROCESS FOR ABSORBING $SO_3$

[75] Inventors: Karl-Heinz Dörr, Mainz; Lothar Reh, Bergen-Enkheim; Hugo Grimm, Frankfurt am Main; Karel Vydra, Bad Nauheim, all of Germany

[73] Assignee: Metallgesellschaft Aktiengesellschaft, Frankfurt am Main, Germany

[22] Filed: Sept. 23, 1974

[21] Appl. No.: 508,443

[30] Foreign Application Priority Data
Sept. 25, 1973 Germany............................ 2348108

[52] U.S. Cl. ........................ 423/242; 55/73; 55/97; 55/222; 261/DIG. 54; 261/157
[51] Int. Cl.²........................................ B01D 53/34
[58] Field of Search ............. 55/89, 49, 84, 73, 240, 55/259, 222, 97; 261/DIG. 54, 116, 152, 157; 423/242, 522

[56] References Cited
UNITED STATES PATENTS

| | | |
|---|---|---|
| 2,034,554 | 3/1936 | Bayer.................................. 423/522 |
| 3,292,345 | 12/1966 | Wunderlich et al. .................... 55/73 |
| 3,403,496 | 10/1968 | Ahlander et al. ......................... 55/73 |
| 3,593,497 | 7/1971 | Grimm et al............................ 55/73 |
| 3,788,043 | 1/1974 | Dorr et al. ............................... 55/73 |
| 3,799,249 | 3/1974 | Linhardt............................ 261/153 |

Primary Examiner—Bernard Nozick
Attorney, Agent, or Firm—Karl F. Ross; Herbert Dubno

[57] ABSTRACT

A process for removing sulfur trioxide from gases wherein the sulfur trioxide-containing gas is treated with sulfuric acid in a Venturi absorber, the sulfur-trioxide laden sulfuric acid is passed in indirect heat exchange with a cooling fluid within the widening outlet of the absorber and the sulfur trioxide-laden sulfuric acid is separated from the gas phase.

2 Claims, 1 Drawing Figure

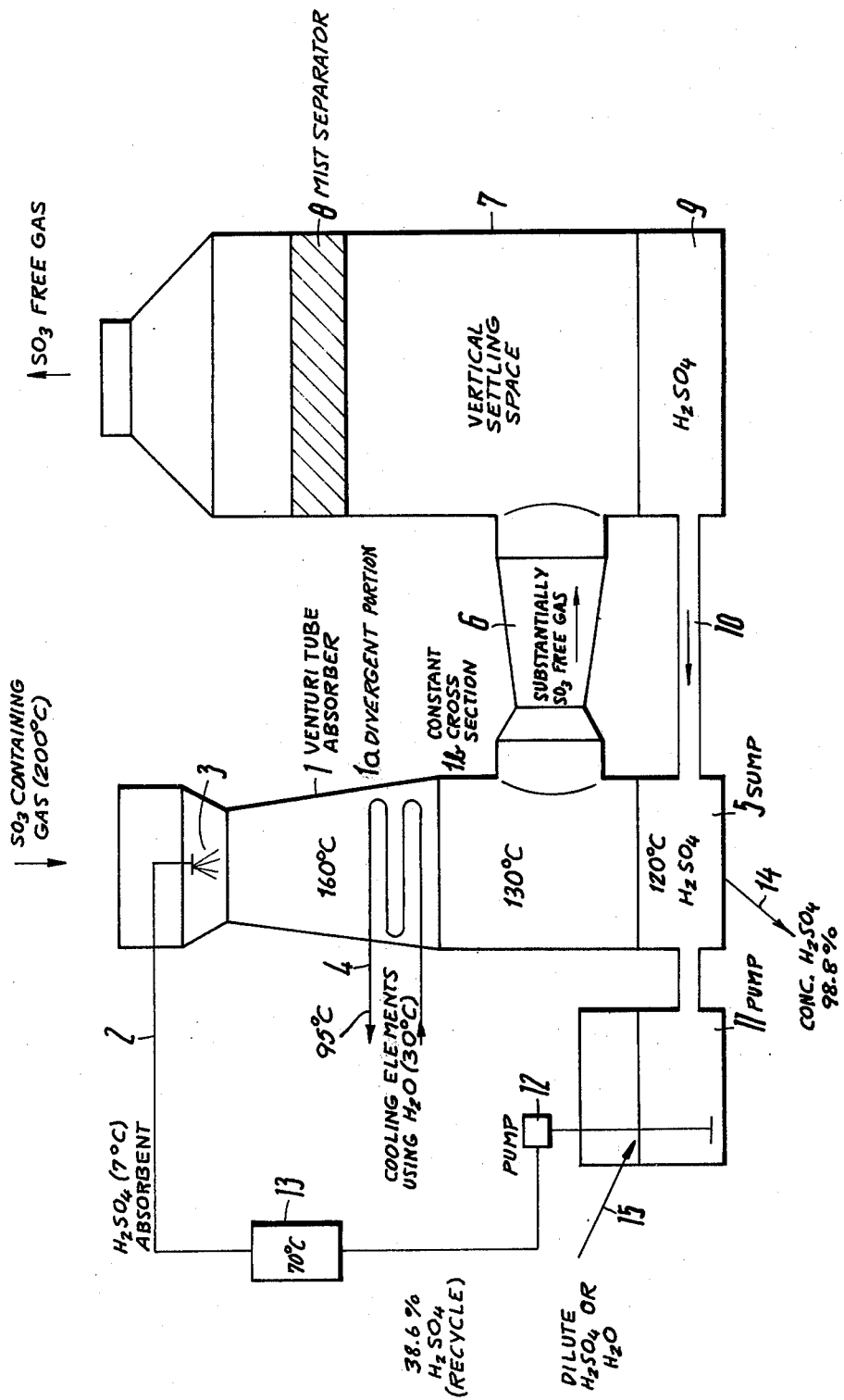

PROCESS FOR ABSORBING $SO_3$

REFERENCE TO RELATED APPLICATIONS

This application is related to commonly assigned co-pending application Ser. No. 287,104 filed Sept. 7, 1972, which in turn was related to copending applications Ser. No. 188,127 and 188,128 filed 12 Oct. 1971, now issued as U.S. Pat. Nos. 3,780,499 and 3,788,043.

FIELD OF THE INVENTION

This invention relates to a process for absorbing $SO_3$ from $SO_3$-containing contact-process product gases in sulfuric acid in a Venturi tube absorber with removal of heat of reaction by heat exchange.

BACKGROUND OF THE INVENTION

In the production of sulfuric acid by the contact process, the resulting $SO_3$ is absorbed in sulfuric acid. In the normal catalytic process the $SO_2$-containing gas is catalytically treated (oxidized) in a plurality of series-connected catalyst trays, whereby the $SO_2$ is largely converted to $SO_3$, which is absorbed when it has left the catalytic reactor. In the double catalystic process, the $SO_3$ formed in a first catalytic stage is absorbed in an interstage (intermediate) absorber. In the second catalytic stage, the remaining $SO_2$ is converted to $SO_3$ and when the $SO_3$ formed in the second catalytic stage has left the catalytic reactor it is absorbed in the final absorber. A plurality of such interstage or intermediate absorbers may be provided.

During the absorption, the sulfuric acid is heated by the heat of reaction which is released and by the heat content of the $SO_3$-containing gases. Cooling is required to remove a corresponding quantity of heat from the acid.

In general, the heat is removed by cooling the absorption liquid ($H_2SO_4$) in trickling coolers or air-cooled coolers. Owing to the small temperature rise of the cooling fluid, the quantity of heat which has been removed cannot be economically recovered and the heat is dissipated.

It is also known to cool the sulfuric acid in a pump receiver or to remove heat from an agitated sulfuric acid layer. In these processes too, a useful recovery of heat is not contemplated and complex and corrosion-sensitive apparatus must be used.

It is also known to cool the sulfuric acid effluent from the absorber in feed water preheaters and thus to heat the feed water. Because the temperature gradient is relatively low and the heat transfer is not large, the feed water preheaters must have large exchange surfaces. Also, the water requirement per cubic meter of acid is large.

OBJECTS OF THE INVENTION

It is an object of the invention to provide a method of removing sulfur trioxide from a gas stream in a highly efficient manner enabling the recovery of absorption heat.

Still another object of the invention is to provide a method of and an apparatus for absorbing $SO_3$ from a gas stream derived from a contact-catalysis stage, in the production of the $H_2SO_4$ wherein the aforementioned disadvantages are obviated.

SUMMARY OF THE INVENTION

This object is accomplished according to the invention in that part of the heat content which is due to the mixing and the reaction and present in the lower portion of the Venturi tube absorber is removed from the Venturi tube absorber by an indirect heat exchange between the gas-sulfuric acid phase and a cooling fluid passed through cooling elements.

A Venturi absorber, according to the invention, is one in which the gas is caused to flow, preferably downwardly, through a conically or otherwise convergent inlet portion through a constriction in which the mixture flows rapidly, and then through a conically or otherwise divergent outlet portion. Below the concially widening outlet there is provided a constant-cross-section portion terminating in a first sump.

A tube coil or nest through which the gas or liquid coolant is passed is placed either in the conically divergent or constant cross-section portion of the Venturi absorber to provide indirect heat exchange with the mixture.

Below the heat-exchange tubes and preferably along the constant-section portion above the liquid level in this sump, the gas stream is deflected at a right angle through a horizontal Venturi whose widening output opens into a constant section vertical separator having a second sump below the horizontal Venturi and a mist trap or separator thereabove. The second sump is connected to the first. Liquid is sprayed into the vertical Venturi absorber at its constriction.

While normally the absorption process is adiabatic the heat exchanger removes substantial amounts of heat.

The heat of mixing is introduced by the admixing of the $SO_3$-containing hot gas with the sulfuric acid. The heat of reaction results from the absorption of the $SO_3$ by the sulfuric acid. The gas and the sulfuric acid are introduced at the top of the Venturi tube absorber. The cooling elements are arranged in the flaring portion of the Venturi tube absorber as indicated, but may also be located below said portion but above the sump consisting of sulfuric acid in the bottom portion of the Venturi absorber where the same is vertical. The surface area of the cooling elements and the rate at which the cooling fluid flows therethrough will depend on the throughput rate of the absorber and the inlet temperatures of the absorber. The cooling elements consist of corrosion-resisting material. Any further cooling of the acid, if required, is accomplished in known manner.

According to a feature of the invention, the removal of heat causes the gas-sulfuric acid phase to have been cooled to about 120°C. as it leaves the region in which the cooling elements are disposed. There are favorable conditions as regards the heat exchange and the degree of absorption at and above that temperature.

Another feature of the invention resides in that boiler feed water is used as a cooling fluid. The use of boiler feed water results in a good cooling and in a good utilization of the removed quantity of heat.

As noted, the apparatus for carrying out the process comprises a vertical Venturi tube absorber with gas and sulfuric acid inlets at the top of the Venturi tube, a sulfuric acid sump under the outlet opening of the Venturi tube, and a horizontal gas outlet disposed above the sump in a vertical settling space, and is characterized in that cooling elements through which the fluid flows are disposed in the lower portion of the Venturi tube above the horizontal gas outlet. This arrangement results in a good absorption and a good and simple removal of heat.

BRIEF DESCRIPTION OF THE DRAWING

The invention will be explained more fully with reference to the accompanying drawing in which the sole FIGURE is a diagrammatic vertical section of an apparatus according to the invention.

SPECIFIC DESCRIPTION

The drawing illustrates a flow scheme of the invention wherein $SO_2$-containing gas, which may come from a catalytic reactor or an interstage cooler, is introduced into the top opening of the Venturi tube absorber 1.

The Venturi tube absorber has an upper section 1a which is conically divergent and a lower section 1b which has a constant cross section.

The sulfuric acid used as an absorbent is supplied through conduit 2 and is sprayed through a nozzle 3. Cooling elements or tubes 4 traversed by a liquid coolant, particularly boiler feed water, are disposed below the spray zone. The sulfuric acid which has been fortified with $SO_3$ delivers to these cooling elements a substantial part of its heat content which is due to the mixing and reaction. The sulfuric acid is separated in the bottom portion 5 of the Venturi tube absorber 1. The gases from which $SO_3$ has been substantially removed flow through a Venturi-like, horizontal outlet 6 into a vertical settling space 7, in which they flow through a mist separator 8 before leaving the settling space 7.

The sulfuric acid which has formed in the bottom portion 9 from droplets of sulfuric acid is added through a transfer conduit 10 to the sulfuric acid in the bottom portion 5 of the Venturi tube absorber 1 and the sulfuric acid flows from there into a pump reservoir 11, from which the sulfuric acid is recycled by a pump 12 in conduit 2 to the nozzle 3. The conduit 2 incorporates a further cooler 13, by which any additional heat can be removed from the sulfuric acid.

Concentrated sulfuric acid is removed from the absorption system through conduit 14. Fresh dilute sulfuric acid or water may be fed into the pump receiver, e.g., through conduit 15.

EXAMPLE

Gas which contained 9.46% by volume $SO_3$ and which was at a temperature of 200°C. was supplied through the top opening of the Venturi tube absorber 1 to the apparatus shown in FIG. 1 at a rate of 93,300 standard cubic meters per hour. The gas was sprayed with sulfuric acid which had a concentration of 98.6% weight and was at a temperature of 70°C. and supplied at a rate of 168.5 cubic meters per hour. Above the cooling elements 4 the sulfuric acid-gas mixture had a temperature of 160°C.

Boiler feed water at a temperature of 30°C. was flown at a rate of 50 cubic meters per hour through the cooling elements 4 and was heated to 95°C. by the gas-liquid mixture flowing past the cooling elements whereas the gas-liquid mixture had been cooled to 130°C. as it emerged below the cooling elements.

The sulfuric acid which had been collected to the bottom portion 5 and transferred into the pump receiver 11 had a mixed temperature of 120°C. owing to the admixing of sulfuric acid from the settling space 7. This sulfuric acid was cooled to 70°C. in the cooler 13 and was sprayed into the Venturi tube absorber 1 for a further absorption of $SO_3$.

Sulfuric acid having a concentration of 98.8% by weight was withdrawn through conduit 14 at a rate of 33.1 cubic meters per hour. Sulfuric acid having a concentration of 97.5% by weight was supplied at the same time through conduit 15 at a rate of 15.9 cubic meters per hour.

We claim:

1. A method of removing sulfur trioxide from a gas stream containing same, comprising the steps of:
   a. spraying sulfuric acid into the sulfur-trioxide gas stream;
   b. passing said sulfur-trioxide containing gas stream in admixture with the sprayed droplets of sulfuric acid as absorbent through a vertical, downwardly-discharging Venturi absorber with a downwardly widening discharge portion having an outlet end;
   c. abstracting heat from the mixture in step (b) by indirect heat exchange with a cooling fluid at a point adjacent the outlet end of the vertical Venturi absorber whereby said mixture is cooled after an initial absorption to a temperature of about 120°C;
   d. collecting the liquid phase of the mixture in a first sump located directly below said discharge portion;
   e. deflecting the gas phase of the mixture through a horizontal Venturi absorber connected to the discharge portion of the vertical Venturi absorber to effect after absorption of sulfur-trioxide from the gas;
   f. passing the gas phase after traversal through the horizontal Venturi into an upwardly extending settling chamber to effect additional after absorption;
   g. collecting mist from the gas phase in the chamber and forming droplets therefrom; and
   h. collecting said droplets in a second sump at the base of said chamber.

2. The method defined in claim 1 wherein the cooling fluid used in step (b) is boiler-feed water.

* * * * *